(12) United States Patent
Wu

(10) Patent No.: US 8,587,283 B2
(45) Date of Patent: Nov. 19, 2013

(54) DC-DC VOLTAGE CONVERTER SYSTEM WITH A HIGH-EFFICIENCY PULSE-SKIP OPERATIONAL MODE

(75) Inventor: Guoming Wu, Shanghai (CN)

(73) Assignee: Analog Devices, Inc., Norwood, MA (US)

( * ) Notice: Subject to any disclaimer, the term of this patent is extended or adjusted under 35 U.S.C. 154(b) by 287 days.

(21) Appl. No.: 13/090,996

(22) Filed: Apr. 20, 2011

(65) Prior Publication Data

US 2012/0268095 A1  Oct. 25, 2012

(51) Int. Cl.
*G05F 1/00* (2006.01)
(52) U.S. Cl.
USPC .......................................................... 323/284
(58) Field of Classification Search
USPC ........................................ 323/284, 285, 223
See application file for complete search history.

(56) References Cited

U.S. PATENT DOCUMENTS

| | | | |
|---|---|---|---|
| 6,972,548 B2 | 12/2005 | Tzeng et al. | 323/282 |
| 7,026,801 B2 | 4/2006 | Fowler et al. | 323/271 |
| 7,045,992 B1 | 5/2006 | Silva et al. | 323/222 |
| 7,109,688 B1 | 9/2006 | Chiu et al. | 323/222 |
| 7,230,408 B1 | 6/2007 | Vinn et al. | 323/273 |
| 7,248,027 B2 | 7/2007 | Ribeiro et al. | 323/282 |
| 7,358,711 B2 | 4/2008 | Sutardja et al. | 323/283 |
| 7,382,114 B2 | 6/2008 | Groom | 323/271 |
| 7,417,879 B2 | 8/2008 | Sawtell | 363/89 |
| 7,652,453 B2 | 1/2010 | Iulian | 323/259 |
| 8,253,407 B2 * | 8/2012 | Chen et al. | 323/288 |

OTHER PUBLICATIONS

Chen, Jingdong, "Determine Buck Converter Efficiency in PFM Mode", Power Electronics Technology, Sep. 2007, pp. 28-33.
Qiao, Michael, et al., "Stabilize the Buck Converter with Transconductance Amplifier", International Rectifier, Application Note AN-1043, Oct. 7, 2002, pp. 1-11.

* cited by examiner

*Primary Examiner* — Harry Behm
*Assistant Examiner* — Matthew Grubb
(74) *Attorney, Agent, or Firm* — Schwegman Lundberg & Woessner, P.A.

(57) ABSTRACT

DC-DC voltage converter systems are provided in which a switching voltage converter is arranged with an inductor to switch first and second currents with duty cycles D and D' determined by an error voltage $V_{err}$ to thereby maintain an output voltage $V_{out}$. A transconductance amplifier having an amplifier output provides the error voltage $V_{err}$ in response to the output voltage and a reference voltage $V_{ref}$. A ripple current $I_{rpl}$ is provided to the amplifier output in response to the difference between the error voltage $V_{err}$ and a clamp voltage $V_{clmp}$. Finally, a current comparator generates a skip signal to turn off the first and second currents in response to a selected threshold of the ripple current. In this process, the ripple current $I_{rpl}$ substantially clamps the error voltage $V_{err}$ to the clamp voltage $V_{clmp}$. Preferably, the current comparator is arranged to provide the skip signal in response to the selected first threshold of the ripple current $I_{rpl}$ and retract the skip signal in response to a selected second threshold of the ripple current $I_{rpl}$.

20 Claims, 3 Drawing Sheets

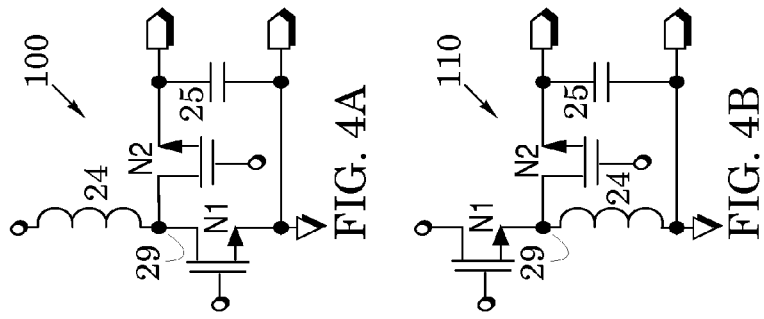
FIG. 4A
FIG. 4B
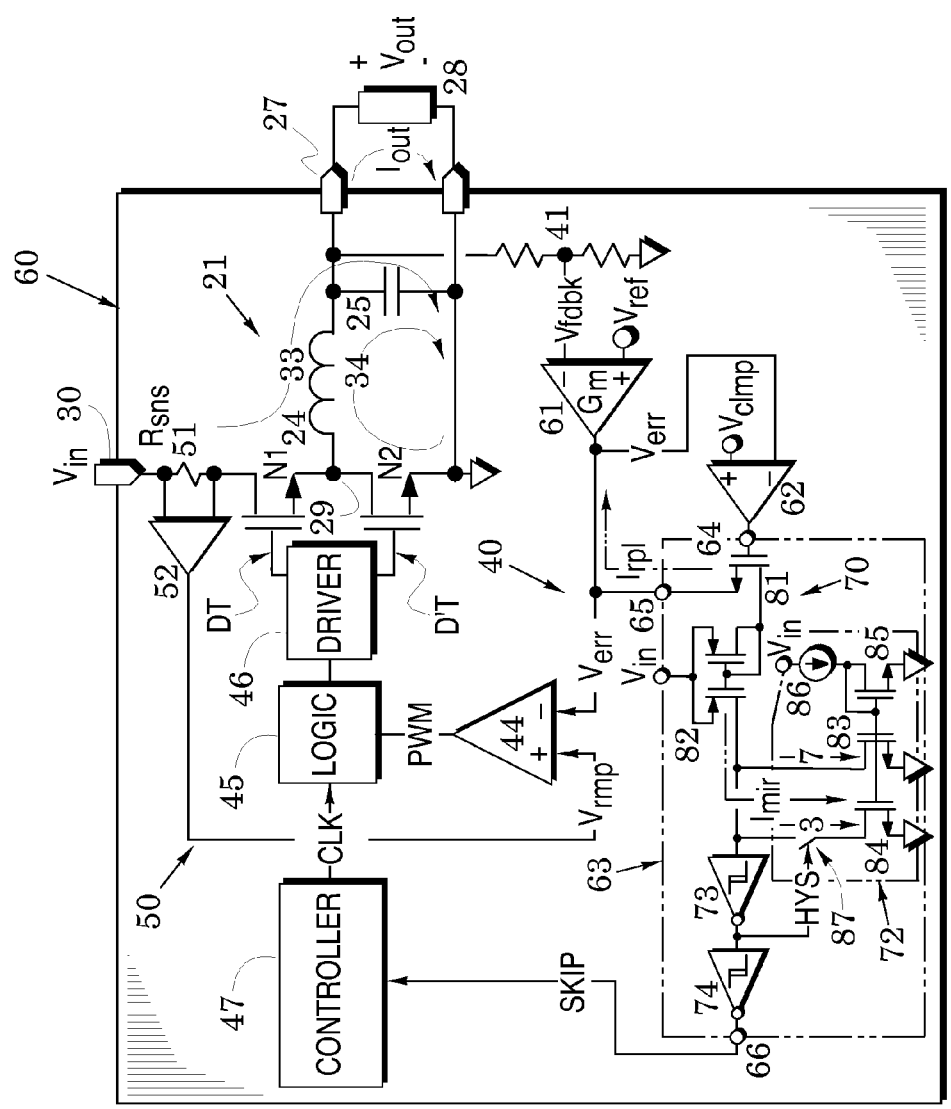
FIG. 2

US 8,587,283 B2

DC-DC VOLTAGE CONVERTER SYSTEM WITH A HIGH-EFFICIENCY PULSE-SKIP OPERATIONAL MODE

BACKGROUND OF THE INVENTION

1. Field of the Invention

The present description relates generally to DC-DC voltage converters.

2. Description of the Related Art

Switched-mode DC-DC voltage converters provide superior voltage conversion efficiency because they regulate an output voltage with transistor switches that are either on or off so that they never operate in the linear region in which both current and voltage are nonzero. Because at least one of transistor current and voltage is therefore always close to zero, dissipation is greatly reduced and the converter efficiency is quite high.

These converters typically include a voltage feedback loop in which the difference between the output voltage and a reference voltage forms an error voltage $V_{err}$. The error voltage can be compared to a fixed voltage ramp to provide a pulse-width modulation signal that determines the duty cycles of a converter's first and second transistors. It has been found that this voltage feedback loop can be augmented with a current feedback loop which replaces the fixed voltage ramp with a ramp whose amplitude is proportional to the converter's input current. The current feedback loop enables the voltage converter to respond more quickly to changes in the input voltage.

These voltage converters are especially efficient when delivering medium-to-high load currents. As the load current drops to lower levels, however, switching losses in the converter's transistors become high relative to the output power and converter efficiency suffers. Various operational modes have been introduced to improve this low-current efficiency but they are generally complex and are typically structured to control only one parameter, e.g., feedback voltage or peak inductor current, which limits their effectiveness.

BRIEF SUMMARY OF THE INVENTION

The present embodiments are generally directed to DC-DC voltage converters that are configured to operate in a high-efficiency pulse-skip operational mode under light load conditions. The drawings and the following description provide an enabling disclosure and the appended claims particularly point out and distinctly claim disclosed subject matter and equivalents thereof.

BRIEF DESCRIPTION OF THE DRAWINGS

FIG. 2 is a schematic of another dc-dc voltage converter system embodiment;

FIGS. 4A and 4B are diagrams of other switching voltage converter embodiments that can be used in the voltage converter system of FIG. 2.

DETAILED DESCRIPTION OF THE INVENTION

Figure 1:
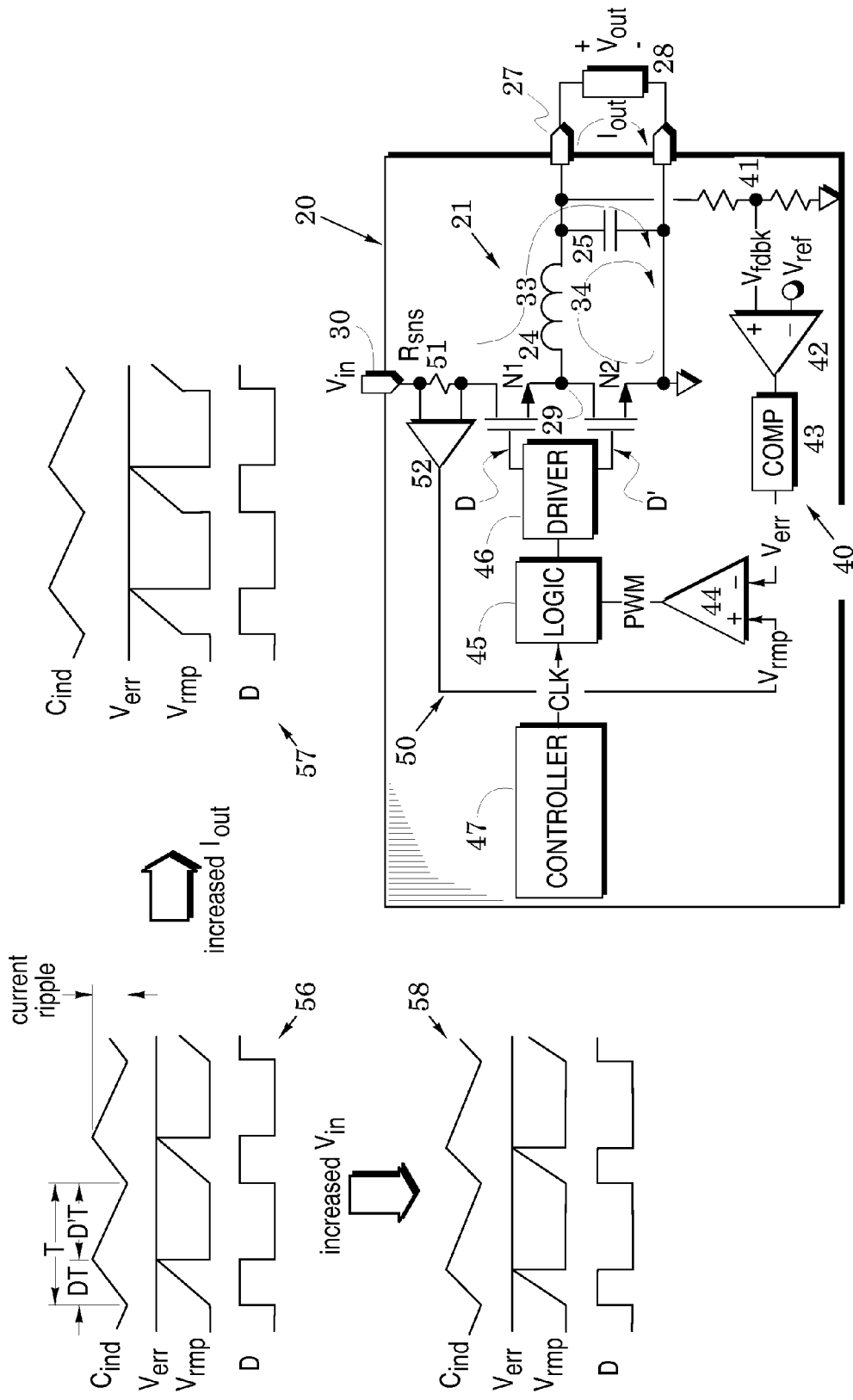
FIG. 1 is a schematic of a dc-dc voltage converter system embodiment and of exemplary waveforms in the converter system.

FIG. 2 illustrates a DC-DC voltage converter system 60 in which a switching voltage converter 21 is arranged with an inductor 24 to switch first and second currents with duty cycles D and D' determined by an error voltage $V_{err}$ to thereby maintain an output voltage $V_{out}$. A transconductance amplifier 61 having a transconductance $g_m$ generates a ripple current $I_{rpl}$ as the product of $g_m$ and the difference between a reference voltage $V_{ref}$ and a feedback voltage $V_{fdbk}$ that corresponds to the output voltage $V_{out}$. Finally, a current comparator 63 generates a skip signal to turn off the first and second currents in response to a selected threshold of the ripple current.

In a voltage converter system embodiment, the ripple current $I_{rpl}$ is provided to the amplifier output by a differential amplifier in response to the difference between the error voltage $V_{err}$ and a clamp voltage $V_{clmp}$.

In this process, the ripple current $I_{rpl}$ substantially clamps the error voltage $V_{err}$ to the clamp voltage $V_{clmp}$. Preferably, the current comparator 63 is arranged to provide the skip signal in response to the selected first threshold of the ripple current $I_{rpl}$ and retract the skip signal in response to a selected second threshold of the ripple current $I_{rpl}$.

To enhance an understanding of the DC-DC voltage converter system 60, its description will be preceded by the following description of the voltage converter system 20 of FIG. 1. This voltage converter system includes a switching voltage converter 21 that is formed with first and second transistors N1 and N2, an inductor 24, and an output capacitor 25. The capacitor is coupled across an output port 27 to supply an output voltage $V_{out}$ and an output current $I_{out}$ to an output load 28. The inductor is coupled between the capacitor and a circuit switching node 29. The low-side second transistor N2 is coupled between the switching node and ground and the high-side first transistor N1 is coupled between the switching node 29 and an input port 30 that receives an input voltage $V_{in}$.

During a first portion of each of successive clock periods, the high-side first transistor N1 is switched on to thereby raise the switching node 29 almost to the input voltage $V_{in}$. This initial action drives a rising first current 33 through the inductor 24. During a final second portion of each of the successive clock periods, the low-side second transistor N2 is switched on to thereby pull the switching node 29 almost to a circuit ground. This final action causes a falling second current 34 to flow through the inductor 24. During both of the first and second portions, the capacitor 25 provides the output current $I_{out}$ to the load 28.

These first and second currents through successive clock periods maintain the output voltage $V_{out}$ in a process that is highly efficient because, in each clock period, each of the first and second transistors is off in one of the period portions and has only a small saturation voltage across it when carrying current in the other period portion. The duration of the first and second portions of each clock period T is adjusted to establish duty cycles D and D' for the first and second transistors that are automatically controlled to maintain the output voltage $V_{out}$ at a predetermined level.

This automatic control is accomplished with a voltage feedback loop 40 that includes a resistive divider 41, a differential amplifier 42, loop compensation 43, comparator 44, logic 45, and driver 46. A controller 47 provides various control signals that include a clock signal which is sent to the logic 45 to set the clock periods. In operation of this feedback loop, the resistive divider provides a feedback voltage $V_{fdbk}$ which the differential amplifier 42 compares to a reference voltage $V_{ref}$ to thereby provide an error voltage $V_{err}$ that is frequency shaped by the frequency response of the compensation 43 to enhance the stability of the loop. The error voltage $V_{err}$ represents a difference between the output voltage $V_{out}$ and the desired reference voltage $V_{ref}$. In a voltage converter embodiment, the error voltage $V_{err}$ can be compared in the comparator 44 to a fixed voltage ramp to provide a pulse-width modulation (PWM) signal to the logic 45.

In response to each period of the clock from the oscillator 47 and to the PWM signal from the comparator 44, the logic 45 commands the driver 46 to turn on the first transistor N1 to realize the duty cycle D that is determined by the error voltage $V_{err}$ (in FIG. 1, the duty cycle D is indicated adjacent the gate of the first transistor N1). The driver 46 subsequently turns on the second transistor N2 for the remainder of each clock period to realize the duty cycle D' (the duty cycle D' is indicated adjacent the gate of the second transistor N2).

Accordingly, the first and second transistors respectively pass the first and second currents 33 and 34 in the respective first and second portions of each clock period to maintain the feedback voltage $V_{fdbk}$ substantially equal to the reference voltage $V_{ref}$. This process will maintain the output voltage $V_{out}$ at the output port 27 at the desired level regardless of the output current $I_{out}$ through the load 28. By definition, the duty cycle D' is given by the expression 1−D and the switching process causes the duty cycle D to equal the ratio $V_{out}/V_{in}$.

Although the voltage feedback loop 40 thereby maintains a desired voltage across the output load 28 and responds quickly to changes in the output current $I_{out}$, it responds relatively slowly (e.g., several clock periods) to changes in the input voltage $V_{in}$ at the input port 30. Therefore, in another voltage converter embodiment, the converter system 20 supplements the voltage feedback loop 40 with a current feedback loop 50 that includes a sense resistor 51 (having a resistance $R_{sns}$) and a differential amplifier 52. Input current from the input port 30 generates a corresponding voltage across the resistor 51 which is amplified by the amplifier 52 to provide a voltage ramp $V_{rmp}$ to the comparator 44. The error voltage $V_{err}$ is compared in the comparator 44 to the voltage ramp $V_{rmp}$ to thereby provide the PWM signal to the logic 45 and set the duty cycles D and D'.

When the input voltage $V_{in}$ is fixed, the voltage ramp $V_{rmp}$ is also fixed and the performance of the converter system 20 is similar to that of the voltage feedback loop embodiment described above that employs a fixed voltage ramp. When the input voltage $V_{in}$ changes, however, these changes are now immediately reflected in the voltage ramp $V_{rmp}$ and, thus, in the PWM signal. Accordingly, the duty cycles of the first and second transistors N1 and N2 are immediately altered to counter the altered input voltage $V_{in}$ and maintain the desired output voltage $V_{out}$ at the output port 27.

The graph 56 of FIG. 1 shows the relationship between the error voltage $V_{err}$ into the PWM comparator 44 and the voltage ramp $V_{rmp}$ which indicates the level of the first current 33 through the inductor 24. When the peak level of the voltage ramp $V_{rmp}$ reaches the error voltage $V_{err}$, the PWM signal switches to cause the logic 45 and driver 46 to turn off the first transistor N1 and turn on the second transistor N2 for the remainder of the clock period. This action sets the duty cycles D and D' of the first and second transistors N1 and N2. For reference, the duty cycle D is shown in the graph 56. In response to the duty cycles of the first and second transistors, the inductor current $C_{ind}$ ramps up during the first portion DT of each clock period T and ramps down during the second portion D'T of each clock period as shown in the graph 56.

A broken-line arrow labeled "increased $I_{out}$" points to the graph 57 of FIG. 1 which shows changes in the graph 56 due to an increase in the output current $I_{out}$ at the output port 27 of the voltage converter system 20 that result from a change in the load 28. Accordingly, input current 33 through the first transistor N1 has increased to answer the demand for additional current in the load 28. Although this causes the voltage ramp $V_{rmp}$ from the amplifier 52 to rise, it does not substantially alter the rising slope of the voltage ramp. The duty cycle D also remains substantially unchanged.

The rising slope of the inductor current is defined as $(V_{in}−V_{out})/L$, so if $V_{in}$ and $V_{out}$ are unchanged but the impedance of the load 28 has decreased (i.e., a heavier load that requires increased output current), then the rising slope is unchanged but the error voltage $V_{err}$ rises and the overall level of the first current 33 rises. This is reflected in the voltage ramp $V_{rmp}$ of graph 57 which has risen in amplitude but whose slope is substantially unchanged.

Another broken-line arrow points to the graph 58 of FIG. 1 which shows changes in the graph 56 due to an increase in the input voltage $V_{in}$ at the input port 30 of the voltage converter system 20. The slope of the rising inductor current is given by $(V_{in}−V_{out})/L$, so that in increase in the input voltage $V_{in}$ causes an increase in the slope of the voltage ramp $V_{rmp}$ as shown in the graph 58. The voltage ramp $V_{rmp}$ rises more quickly to the point at which it matches the error voltage $V_{err}$ so that the duty cycle D decreases as would be expected since the ratio $V_{out}/V_{in}$ has decreased.

The duty cycle D, therefore, changes in response to changes in the input voltage $V_{in}$ but does not substantially change in response to changes in the load 28 which causes changes in the output current $I_{out}$. When the impedance of the load 28 increases (i.e., a light load demanding less current), the output current $I_{out}$ at the output port 27 decreases. Thus, the output power decreases but the switching losses in the first and second transistors N1 and N2 remain constant so that operating efficiency goes down.

In contrast to the system 20 of FIG. 1, the voltage converter system embodiment 60 of FIG. 2 is configured to improve converter efficiency under light load conditions. The system 60 includes elements of the system 20 of FIG. 1 with like elements indicated by like reference numbers. However, the system 60 replaces the differential amplifier 42 with a transconductance amplifier 61 that has a transconductance $g_m$ such that a voltage difference $V_{diff}$ at its input terminals provides a ripple current $g_m V_{diff}$ at its output port.

The system 60 also includes a differential amplifier 62 and a current comparator 63. The differential amplifier provides a voltage to an input port 64 of the current comparator 63 wherein this voltage corresponds to a difference between the voltage at the output of the transconductance amplifier and a clamp voltage $V_{clmp}$. The current comparator 61 is configured to respond to this voltage by providing a ripple current $I_{rpl}$ to the output of the transconductance amplifier 61. The current comparator 63 is further configured to provide a skip signal at an output port 66 when the ripple current $I_{rpl}$ is above a predetermined first threshold and to retract the skip signal when the ripple current $I_{rpl}$ drops below a predetermined second threshold.

Figure 3:
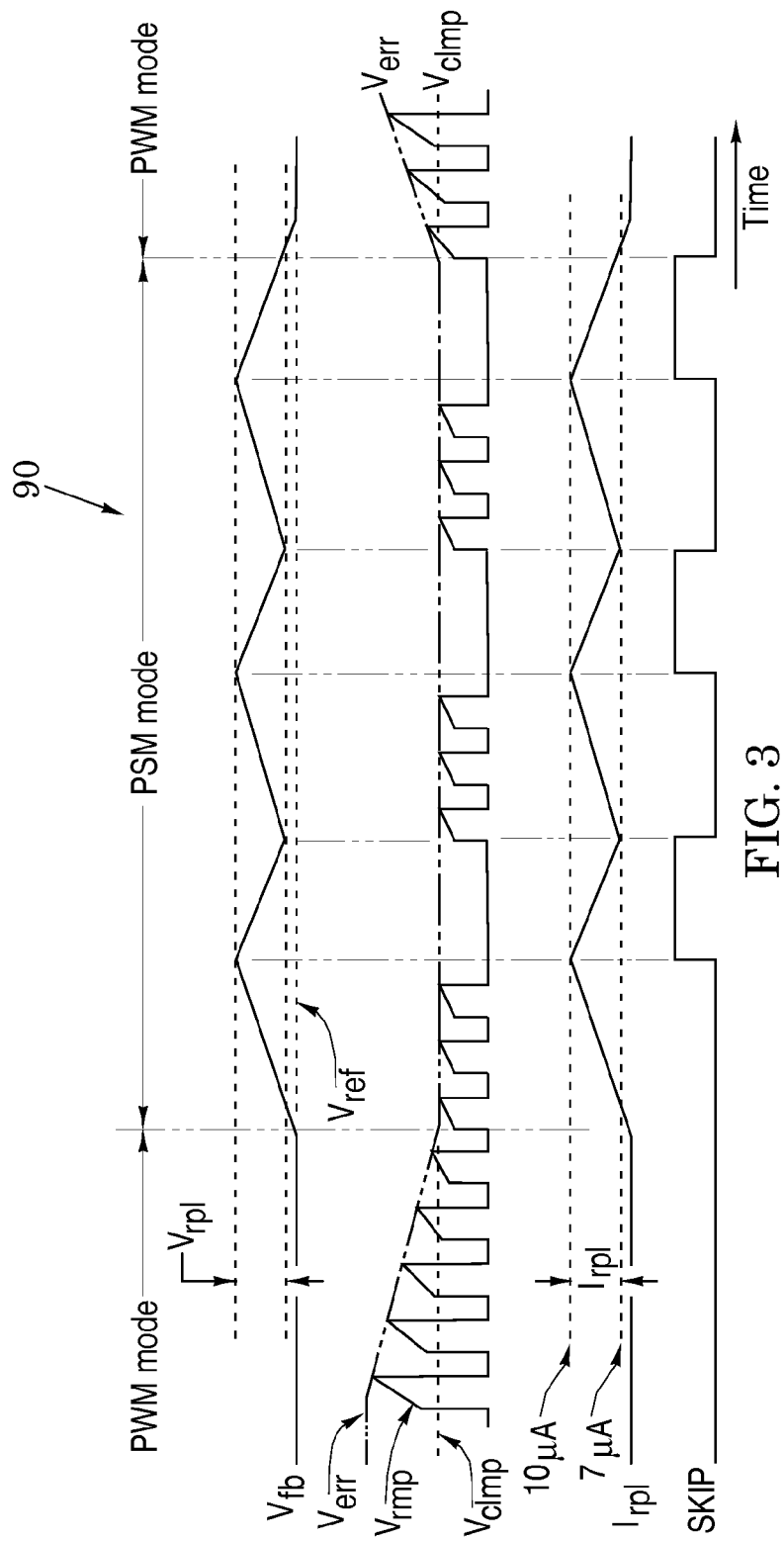
FIG. 3 is a graph that illustrates operational waveforms in the converter system of FIG. 2.

The operational method of the voltage converter system 60 is illustrated in the graph 90 of FIG. 3. In the left hand side of this graph, the error voltage $V_{err}$ is declining because the output current $I_{out}$ demanded by the load 28 in FIG. 2 is declining. As previously noted, the ramp voltage $V_{rmp}$ at the comparator 44 of FIG. 2 corresponds to the amplitude of the rising current 33 in the inductor 24 in FIG. 2 during the first portion of each clock period. As previously described, when the ramp voltage $V_{rmp}$ reaches the error voltage $V_{err}$, the comparator 44 turns off the first transistor N1 of FIG. 2 and turns on the second transistor N2 for the remainder of the clock period.

As the error voltage $V_{err}$ continues to decline it reaches the level of the clamp voltage $V_{clmp}$. In response, the differential amplifier 62 of FIG. 2 applies a positive signal to the port 64 of the current comparator 63 to thereby initiate the ripple current $I_{rpl}$ which passes from the port 65 of the current comparator to the output of the transconductance amplifier 61. The ripple current $I_{rpl}$ into the output of the transconductance amplifier effectively clamps the error voltage $V_{err}$ just below the clamp voltage $V_{clmp}$ as shown in the graph 90 and does not let it fall any further.

Clamping the error voltage $V_{err}$ causes the feedback voltage $V_{fdbk}$ to begin to rise in FIG. 3. At the same time, the rising amplitude of the ripple current $I_{rpl}$, causes it to reach the first threshold (e.g., FIG. 3 shows a first threshold of 10 microamperes). In response, the current comparator 63 is configured to provide, at an output port 66, the skip signal to the controller 47 (or, in other system embodiments, to the logic 45 and/or the driver 46) which turns off both of the first and second transistors N1 and N2.

The absence of any drive current out of the output port 27 in FIG. 2 now causes the feedback voltage $V_{fdbk}$ to begin to drop. Because the ripple current is the product of the transconductance $g_m$ and a voltage difference at the input of the transconductance amplifier 61, the ripple current $I_{rpl}$ begins to fall. When the falling amplitude of the ripple current $I_{rpl}$ reaches a second threshold (e.g., FIG. 3 shows a second threshold of 3 microamperes) the current comparator 63 is configured to retract the skip signal. In response, the controller 47 activates the first and second transistors N1 and N2 again.

The graph 90 of FIG. 3 shows a continuation of this described process. As long as the demand for the output current $I_{out}$ remains low, the error voltage $V_{err}$ remains clamped below the clamp voltage $V_{clmp}$. The feedback voltage $V_{fdbk}$ alternately rises and falls in respective response to the first and second transistors N1 and N2 first being turned on and off in each clock period and then being turned off completely. In response to the feedback voltage, the transconductance amplifier 61 causes the ripple current $I_{rpl}$ to rise and fall. When the ripple current falls to the second threshold, the skip signal is turned off to thereby enable the first and second transistors N1 and N2. When it rises to the first threshold, the skip signal is turned on to thereby disable the first and second transistors. This operational mode is called the pulse skip mode (PSM) because it periodically disables, i.e., skips, the pulsing of the first and second transistors N1 and N2.

The graph 90 of FIG. 3 also shows the end of the pulse skip mode and the return to the PWM mode. As the demand of the output current $I_{out}$ begins to rise, the feedback voltage $V_{fdbk}$ drops below the reference voltage $V_{ref}$. In response, the error voltage $V_{err}$ begins to rise above the clamp voltage $V_{clmp}$ so that the ripple current $I_{rpl}$ is turned off. In response, the skip signal is turned off so that the first and second transistors N1 and N2 are again turned on and off in each clock period.

FIG. 2 also illustrates an embodiment of the current comparator 63. This embodiment includes a current mirror 70, a current sink 72, and first and second hysteresis inverters 73 and 74 that are coupled in series and are driven by a circuit node between the current mirror and the current sink. The current mirror 70 includes a pair 82 of gate-coupled transistors and a third transistor 81 coupled to pull current from one of the pair that is diode-coupled. The third transistor 81 is driven by the differential amplifier 62 and provides the ripple current $I_{rpl}$ to the transconductance amplifier 61.

The gate-coupled transistor pair 82 is coupled to provide mirror currents $I_{mir}$ to the first and second transistors 83 and 84 of the current sink 72. These transistors are gate coupled to a diode-coupled transistor 85 that receives current from a current source 86. The current sink 72 also includes a switch 87 that is driven by a hysteresis signal HYS from a node between the first and second hysteresis inverters 73 and 74. The switch is positioned in the current path of the second transistor 84.

In an exemplary system embodiment, the first and second transistors 83 and 84 are scaled to carry currents of 3 and 7 microamperes respectively. When the switch 87 is closed, the current sink 72 is thus configured to sink a current of 10 microamperes. When it is open, the current sink 72 is configured to sink a current of 3 microamperes. These current levels define the current ripple $I_{rpl}$ in the graph 90 of FIG. 3.

In operation of this embodiment of the current comparator 63, the current sink 72 initially tries to pull 10 microamperes of mirror current $I_{mir}$ from the current mirror 82. If the error voltage $V_{err}$ has not yet been clamped below the clamp voltage $V_{clmp}$, there is no ripple current $I_{rpl}$ available so that the current mirror 70 cannot mirror any current to the current sink 72. Accordingly, the node between the mirror and the sink remains low so that there is no skip signal and the switch 87 remains closed. As the error voltage $V_{err}$ drops and becomes clamped below the clamp voltage $V_{clmp}$, the ripple current $I_{rpl}$ flows and mirrors a mirror current $I_{mir}$ of 10 microamperes. The circuit node between the mirror and the sink rises to thereby turn on the skip signal and to open the switch 87. The voltage converter system 60 is now in the PSM mode of FIG. 3.

In the PSM mode, the system 60 alternates between rises and drops in the feedback voltage $V_{fdbk}$. A rise increases the ripple current $I_{rpl}$ out of the differential amplifier 62. In response, the mirror current $I_{mir}$ reaches 10 microamperes. The circuit node between the mirror and the sink rises to thereby turn on the skip signal and to open the switch 85. The voltage converter system 60 is now in the PSM mode of FIG. 3. During a subsequent drop in the feedback voltage $V_{fdbk}$, the ripple current $I_{rpl}$ out of the differential amplifier 62 decreases. When the responding mirror current $I_{mir}$ drops below 3 microamperes, the circuit node between the mirror and the sink drops to thereby turn off the skip signal and to close the switch 87. The voltage converter system 60 has now returned to the PSM mode of FIG. 3.

It is noted that the inverters 73 and 74 are preferably hysteresis inverters which switch their outputs high in response to a first input level and switch their outputs low in response to a second input level below the first level. This hysteresis effect prevents inadvertent toggling of the inverters. In addition, the skip signal is enabled at the first threshold of the ripple current and disabled at a lower second threshold. The difference between these thresholds also provides a hysteresis effect (i.e., one in which reaction to an event depends upon a past reaction) that enhances the system's stability.

The voltage converter system embodiment 60 of FIG. 2 is configured to reduce the amount of ripple in the feedback voltage $V_{fdbk}$ and, therefore, the output voltage $V_{out}$ during light load conditions. The amplitude of the ripple can be set by adjusting amplitudes of the mirror currents $I_{mir}$ in the current sink 72 of FIG. 2. The system's configuration insures the transition between the PWM and PSM modes is automatic and smooth. It occurs as the error voltage sinks below and rises above the clamp voltage $V_{clmp}$ of the differential amplifier 62 to thereby adjust the amplitude of the ripple current $I_{rpl}$.

When the system is in the PSM mode, the error voltage $V_{err}$ is clamped to the clamp voltage $V_{clmp}$. The peak of the ramp voltage $V_{rmp}$ is limited to this clamped error voltage $V_{err}$ by action of the comparator 44 and the feedback paths 40 and 50. Since the peak current of the rising inductor current 33 (see FIG. 2), corresponds to the peak of the ramp voltage $V_{rmp}$, the peak inductor current is well controlled through the actions of the transconductance amplifier 61, the differential amplifier 62 and the current comparator 63.

In addition, the current comparator 63 is configured with different amplitudes of mirror currents $I_{mir}$ so that the skip signal is generated at one mirror current amplitude and removed at a different amplitude. The difference between these mirror current amplitudes also provides a hysteresis effect that enhances system stability. The different amplitudes of mirror currents $I_{mir}$ correspond to different amplitudes of the ripple current $I_{rpl}$ which, in turn, correspond to different values of the feedback voltage $V_{fdbk}$. Accordingly, the voltage ripple $V_{rpl}$ (shown in FIG. 3) is also well controlled.

From the above disclosures, it is apparent the advantages of the disclosed voltage converter systems can be obtained with processes exemplified by the following steps:
arranging a switching voltage converter with an inductor to switch through said inductor first and second currents with duty cycles determined by an error voltage to thereby maintain an output voltage;
coupling a transconductance amplifier having an amplifier output to provide the error voltage in response to the output voltage and a reference voltage;
providing a ripple current to the amplifier output in response to the difference between the error voltage and a clamp voltage; and
with a current comparator, generating a skip signal to turn off the first and second currents in response to a selected threshold of the ripple current;
the ripple current substantially clamping the error voltage to the clamp voltage.

The switching voltage converter 21 in the system 60 of FIG. 2 has been shown in a buck configuration in which the first and second transistors N1 and N2 are coupled together to form a switching node 29, the capacitor 25 is coupled across the output port 27, and the inductor is coupled between the switching node 29 and the capacitor 25. However, the teachings described above may be applied to other switching voltage converter embodiments.

For example, the teachings can be used in a boost configuration 100 shown in FIG. 4A in which the first and second transistors are coupled together to form a switching node, the capacitor is coupled across the output port and is also coupled to the second transistor, and the inductor is coupled between the input port and the switching node.

For a second example, the teachings can be used in a buck-boost configuration 110 shown in FIG. 4B in which the first and second transistors are respectively coupled to the input and output ports and further are coupled together to form a switching node, the capacitor is coupled across the output port, and the inductor is coupled to the switching node.

The converter system embodiments described herein are exemplary and numerous modifications, variations and rearrangements can be readily envisioned to achieve substantially equivalent results, all of which are intended to be embraced within the spirit and scope of the appended claims.

I claim:

1. A voltage converter system to provide an output voltage, comprising:
a switching voltage converter having an inductor and arranged to switch through said inductor first and second currents with duty cycles controlled by an error voltage to thereby maintain said output voltage;
a first amplifier having an amplifier output that provides said error voltage in response to said output voltage and a reference voltage;
a differential amplifier arranged to provide a ripple current to said first amplifier output in response to the difference between said error voltage and a clamp voltage; and
a current comparator arranged to provide a skip signal to turn off said first and second currents in response to a selected first threshold of said ripple current, said current comparator arranged to retract said skip signal in response to a selected second threshold of said ripple current;
wherein said current comparator includes:
a first current mirror arranged to provide, at a comparison node, a mirror current proportional to said ripple current;
a current sink, coupled to the comparison node to receive the mirror current proportional to said ripple current, the current sink including first and second current sink legs configured to provide respective first and second sink currents at the comparison node, at least one of the first and second sink currents being switchably isolatable from the comparison node; and
a switch arranged to switchably isolate said second current sink leg of said current sink from said comparison node.

2. The system of claim 1, wherein said switch is switched to perform the switchable isolation in response to a voltage at the comparison node.

3. The system of claim 1 wherein said first threshold exceeds said second threshold.

4. The system of claim 1 wherein said
current sink is arranged to provide said skip signal in response to a selected first threshold of said mirror current and remove said skip signal in response to a selected second threshold of said mirror current.

5. The system of claim 4, wherein said current comparator further includes
an inverter coupled to the comparison node, the inverter configured to provide said skip signal, and wherein said switch is switched to perform the switchable isolation in response to an output signal of said inverter.

6. The system of claim 5, further including a second inverter to provide said skip signal in response to said first inverter.

7. The system of claim 5, wherein said first amplifier determines a current at said amplifier output in response to said output voltage and said reference voltage.

8. The system of claim 1, wherein said switching voltage converter further includes:
first and second transistors coupled together to form a switching node; and
a capacitor to provide said output voltage;
wherein said inductor is coupled between said switching node and said capacitor.

9. The system of claim 1, wherein said switching voltage converter further includes:
a first transistor coupled to said inductor; and
a capacitor coupled to a second transistor to provide said output voltage, wherein said second transistor is coupled between said inductor and said capacitor.

10. The system of claim 1, wherein said switching voltage converter further includes:
first and second transistors coupled to said inductor; and
a capacitor coupled to said second transistor to provide said output voltage.

11. A voltage converter system to provide an output voltage, comprising:
a switching voltage converter having an inductor and arranged to switch through said inductor first and second currents with duty cycles determined by a pulse width modulation signal to thereby maintain said output voltage;

a first amplifier having an amplifier output that provides an error voltage in response to said output voltage and a reference voltage;

a second amplifier connected to provide a ramp voltage substantially proportional to said first current;

a comparator coupled to provide said pulse width modulation signal in response to the difference between said ramp voltage and said error voltage;

a differential amplifier arranged to provide a ripple current to said first amplifier output in response to the difference between said error voltage and a clamp voltage; and a current comparator, including:
  a first current mirror arranged to provide, at a comparison node, a mirror current proportional to said ripple current;
  a current sink, coupled to the comparison node to receive the mirror current proportional to said ripple current, said current sink including a current sink leg that is switchably isolatable from said comparison node; and
  a first inverter, coupled to the comparison node, said inverter configured to provide a skip signal to turn off said first and second currents in response to a selected threshold of said ripple current.

12. The system of claim 11, comprising a switch arranged to switchably isolate said current sink leg of said current sink from said comparison node.

13. The system of claim 12, wherein said
  first inverter is configured to provide said skip signal in response to a selected first threshold of said ripple current and remove said skip signal in response to a selected second threshold of said ripple current.

14. The system of claim 13, further comprising a second inverter to provide said skip signal in response to said first inveter.

15. The system of claim 11, wherein said switching voltage converter further includes:
  first and second transistors coupled together to form a switching node; and
  a capacitor to provide said output voltage;
  wherein said inductor is coupled between said switching node and said capacitor.

16. The system of claim 11, wherein said switching voltage converter further includes:
  a first transistor coupled to said inductor; and
  a capacitor coupled to a second transistor to provide said output voltage, wherein said second transistor is coupled between said inductor and said capacitor.

17. The system of claim 11, wherein said switching voltage converter further includes:
  first and second transistors coupled to said inductor; and
  a capacitor coupled to said second transistor to provide said output voltage.

18. A method to provide an output voltage, comprising the steps of:
  arranging a switching voltage converter with an inductor to switch through said inductor first and second currents with duty cycles controlled by an error voltage to thereby maintain said output voltage;
  coupling a first amplifier having an amplifier output to provide said error voltage in response to said output voltage and a reference voltage;
  providing a ripple current to said amplifier output in response to the difference between said error voltage and a clamp voltage;
  providing a mirror current that is proportional to said ripple current, the mirror current provided at a comparison node;
  switchably sinking a portion of said mirror current from said comparison node using a current sink; and
  generating a skip signal to turn off said first and second currents in response to a selected threshold of said mirror current at said comparison node.

19. The method of claim 18, wherein generating said skip signal includes the steps of:
  providing said skip signal in response to a selected first threshold of said ripple current; and
  retracting said skip signal in response to a selected second threshold of said ripple current.

20. The method of claim 19, wherein generating said skip signal includes
  providing a switch control signal, based on said skip signal, in response to said mirror current at said comparison node.

* * * * *